UNITED STATES PATENT OFFICE 2,514,150

INSECTICIDES PRODUCED BY REACTING TRIALKYL PHOSPHATES WITH THIOPHOSPHORYL HALIDES AND THEIR PREPARATION

Alan Bell, Kingsport, Tenn., assignor to Eastman Kodak Company, Rochester, N. Y., a corporation of New Jersey No Drawing. Application December 26, 1946, Serial No. 718,614

13 Claims. (Cl. 167—22)

This invention relates to compounds having insecticidal properties prepared by reacting trialkyl phosphates or thiophosphates with thiophosphoryl halides.

Up until recent years the insecticides usually depended upon were the arsenates for use as stomach poisons and nicotine sulfate for use as a contact insecticide. Recent developments have brought out new insecticides having valuable characteristics not associated with the older types of insecticides. Some of these newer insecticides are known under the names rotenone, pyrethrum, DDT, and Bladan. These newer types of insecticides ordinarily exhibit high toxicity to the lower forms of animal life, but the danger of poisoning the higher forms of animal life is much less than with the older types of insecticides.

One object of my invention is to provide a new type of phosphorus compounds having pronounced insecticidal properties. Another object of my invention is to provide a process of preparing insecticidal properties in which a trialkyl phosphate can be employed as the starting material. A further object of my invention is to provide a process for preparing insecticidal materials in which both phosphorus and sulfur are contained in the molecule. Other objects of my invention will appear herein.

I have found that low trialkyl phosphates or thiophosphates can be reacted with thiophosphoryl halides thereby forming materials having good insecticidal properties. In the reaction which occurs there is formed tri-dialkyl phospho thiophosphate and an alkyl halide. When the ethyl compound is prepared, the ethyl halide distills off during the carrying out of the reaction and, therefore, the residue which remains consisting principally of tri-diethyl phospho thiophosphate may be used directly as an insecticide. If a higher alkyl, such as butyl is used, it is desired after the reaction is completed to subject the mass to distillation using a very slightly diminished pressure to remove the butyl halide from the residue which is obtained.

My process of making insecticides makes possible the use of triethyl phosphate, such as may be prepared by the process described and claimed in U. S. Patent No. 2,407,279, dated September 10, 1946, of Hull and Snodgrass. However, other trialkyl phosphates may be employed as the starting material in the process of my invention, some of the materials which are useful in this connection being tripropyl phosphate, tri-isopropyl phosphate, tributyl phosphate, triamyl phosphate, trimethyl phosphate, and tri-2-ethyl hexyl phosphate. Any of the phosphates of alkyls of up to 8 carbon atoms may be employed as the starting material in the process of my invention. If desired, trialkyl phosphates in which the alkyl groups have substituents thereon, such as chlorine or other halogen or alkoxy groups may be employed to prepare insecticides having effective toxic properties by the process described herein. Also, the halogen may be linked to the phosphorus. I have found that the insecticides prepared using the lower alkyl radicals, such as ethyl or methyl, are more immediately effective than the materials containing the higher alkyl radicals, whereas the latter retain their toxicity over a longer period of time and are more resistant to hydrolysis than the lower alkyl compounds. It is, therefore, often desirable to mix the lower and higher alkyl derivatives, such as ethyl with propyl or butyl to obtain both the effects of immediate and prolonged toxicity when using those materials. Thiophosphoryl chloride will ordinarily be employed for the reaction with the trialkyl phosphate. However, other thiophosphoryl halides, particularly the bromide, are suitable for use in this connection. Also, compounds such as $P_2S_5$ or other phosphorus sulfides may be used.

As the reaction which occurs involves one mole of the thiophosphoryl halide to every three moles of the trialkyl phosphate, it is desirable in carrying out the process that the starting materials be used in approximately these amounts, although use of an excess of either of the two reactants over that required does not interfere with the reaction occurring. The reaction is promoted by the application of heat, it being usually desirable to heat the mixture of the reactants to at least 80° C. to promote the reaction. Higher temperatures, such as from 130 to 160° C. might be employed in carrying out the process. In cases where the reaction is vigorous, it might be desirable to apply external cooling to limit the intensity of the reaction. Although the use of a higher temperature shortens the reaction time, it also increases the chances for decomposition of the product being prepared. Therefore, it is ordinarily preferable to select a temperature for carrying out the reaction short of that at which objectionable decomposition occurs.

The following examples illustrate my invention:

*Example 1.*—102 parts (.6 moles) of thiophosphoryl chloride were mixed with 345 parts (1.9 moles) of triethyl phosphate, and the mass was heated to 140–150° C. where the temperature was maintained for one hour during which substantially all of the ethyl chloride formed was driven off. 355 parts of a liquid consisting principally of tri-diethyl phospho thiophosphate were formed which liquid was soluble in water and the ordinary organic solvents, such as kerosene, alcohol, etc. This liquid was useful for insecticidal purposes without any further purification.

*Example 2.*—34 parts of thiophosphoryl chloride were mixed with 170 parts of tributyl phosphate, and the mass was heated to 140–160° C. for one hour. The butyl chloride formed was evaporated off under slightly reduced pressure. 190 parts of a liquid consisting principally of tri-dibutyl phospho thiophosphate were obtained, which liquid was insoluble in water but was soluble in the common organic solvents. This material was useful as an insecticide without further purification.

Example 3.—51 parts of thiophosphoryl chloride were mixed with 132 parts of trimethyl phosphate. The mass was heated to 100° C. whereupon the reaction became vigorous and external cooling was applied to keep the temperature below 140° C. 140 parts of a light-colored liquid consisting principally of tri-dimethyl phospho thiophosphate were obtained, which liquid could be employed directly as an insecticide without further purification.

The compounds prepared in accordance with my invention are useful insecticides. For example, a large number of German roaches was dusted with a dust containing 2½ percent of tri-diethyl phospho thiophosphate and 100 percent kill was obtained in twenty-four hours. In further toxicity tests with this material under varied conditions on German roaches in one instance a 20 percent kill was obtained in one hour and in six hours a 90 percent kill was obtained. In another instance, a 60 percent kill was obtained in one hour and in six hours an 80 percent kill was obtained. This material in spray form was applied to tomato and bean plants, and no injury was noted to the foliage of these plants. Nevertheless, this spray was effective against plant lice, the concentration being one part of the tri-diethyl phospho thiophosphate in 800 parts of water using ½ percent of wetting agent therein.

While in the above examples I have described my preferred operation, my process may be carried out utilizing other phosphorus reagents. For example, phosphorus pentasulfide may be employed as follows:

Example 4.—145 parts of triethylphosphate and 45 parts of phosphorus pentasulfide were heated together at 100–110° C. for about 1½ hours until all the sulfide had dissolved. The resulting brown colored oil (190 parts) was used directly as an insecticide, $d_4^{20}=1.218$; $\eta_4^{20}=1.483$.

In view of the foregoing, it will be observed that I have provided novel methods of preparing various new types of phosphorus and sulfur containing insecticides.

Products prepared in accordance with my invention are effective against plant lice, aphids, spiders, flies, bean beetle, Harlequin bug, etc., in concentrations as low as one part to 2,000 parts of water. For maximum efficiency it is desirable that the solution be used within a few hours after its preparation, particularly in the case of the methyl and ethyl compounds. I have found that when solutions are prepared of the compounds in accordance with my invention in non-polar solvents or compositions of those solvents that the insecticide retains its toxicity almost indefinitely. Solvents which are useful are highly concentrated alcohol, kerosene, Stoddard solvent, carbon tetrachloride, ethylene chloride, benzene, xylene, ligroin, acetone, highly concentrated isopropyl alcohol, or, in fact, any solvent in which the compounds of my invention are soluble.

One of the disadvantages of the older types of insecticides was that a poisonous residue usually remained upon the material which had been treated therewith. An advantage of the insecticides of my invention is that although those compounds exhibit toxicity over a substantial period, such as up to twenty-four to forty-eight hours or substantially longer, these materials do not have a permanent residual toxicity and, therefore, are particularly useful in the spraying of products of fruits or vegetable products which are intended for human consumption.

I claim:

1. A process for preparing compounds having insecticidal properties which comprises heating a trialkyl orthophosphate with a liquid thiophosphoryl halide whereby the alkyl halide formed is driven off and a tri-dialkyl phospho thiophosphate is obtained.

2. A process for preparing compounds having insecticidal properties which comprises heating a trialkyl orthophosphate with thiophosphoryl chloride whereby the alkyl chloride formed is driven off and a tri-dialkyl phospho thiophosphate is obtained.

3. A process for preparing insecticidal material which comprises heating together triethyl phosphate and thiophosphoryl chloride whereby the ethyl chloride formed is removed and a tri-diethyl phospho thiophosphate is obtained.

4. An insecticidal material essentially consisting of tri-dialkyl phospho thiophosphate, the alkyl groups of which are of 1–8 carbon atoms.

5. An insecticidal material essentially consisting of tri-diethyl phospho thiophosphate.

6. An insecticidal material essentially consisting of a mixture of tri-diethyl phospho thiophosphate and a tri-dialkyl phospho thiophosphate, the alkyl of which is of 3–4 carbon atoms.

7. A solution useful for insecticidal purposes of a tri-diethyl phospho thiophosphate in a polar solvent.

8. A solution useful for insecticidal purposes comprising a solution of tri-diethyl phospho thiophosphate in a highly concentrated alcohol.

9. A solution useful for insecticidal purposes comprising tri-dialkyl phospho thiophosphate in a liquid petroleum distillate.

10. An insecticidal spraying liquid comprising one part of tri-diaryl phospho thiophosphate in 800–10,000 parts of an aqueous solvent therefor and a small amount of a wetting agent.

11. A process for preparing insecticidal materials which comprises heating together a trialkyl orthophosphate and phosphorus pentasulfide.

12. A process for preparing insecticidal material which comprises heating together triethyl phosphate and phosphorus pentasulfide.

13. The insecticidal material which results from the heating together of a trialkyl orthophosphate and phosphorus pentasulfide.

ALAN BELL.

REFERENCES CITED

The following references are of record in the file of this patent:

UNITED STATES PATENTS

| Number | Name | Date |
|---|---|---|
| 2,063,629 | Salzberg | Dec. 8, 1936 |
| 2,143,639 | Caprio | Jan. 10, 1939 |
| 2,242,260 | Prutton | May 20, 1941 |
| 2,336,302 | Schrader | Dec. 7, 1943 |
| 2,403,792 | Engelke | July 9, 1946 |
| 2,432,095 | Frey | Dec. 9, 1947 |

OTHER REFERENCES

"Chemical & Engineering News," vol. 23, No. 17, Sept. 10, 1945, pages 1520–1521.